US012128960B2

(12) United States Patent
Soonthornwinate et al.

(10) Patent No.: US 12,128,960 B2
(45) Date of Patent: Oct. 29, 2024

(54) TAILGATE SUPPORT CABLE ASSEMBLY WITH TOUCH SENSOR ACTIVATION FEATURE

(71) Applicant: Toyota Motor Engineering & Manufacturing North America, Inc., Plano, TX (US)

(72) Inventors: Tarakorn Soonthornwinate, Plymouth, MI (US); Kevin J. James, Saline, MI (US); James D. Cunningham, Clarkston, MI (US)

(73) Assignees: Toyota Motor Engineering & Manufacturing North America, Inc., Plano, TX (US); Toyota Jidosha Kabushiki Kaisha, Toyota Aichi-Ken (JP)

( * ) Notice: Subject to any disclaimer, the term of this patent is extended or adjusted under 35 U.S.C. 154(b) by 351 days.

(21) Appl. No.: 17/742,839

(22) Filed: May 12, 2022

(65) Prior Publication Data

US 2023/0365200 A1 Nov. 16, 2023

(51) Int. Cl.
*B62D 33/027* (2006.01)
*B60J 5/10* (2006.01)
(Continued)

(52) U.S. Cl.
CPC ........... *B62D 33/0273* (2013.01); *B60J 5/102* (2013.01); *B62D 33/03* (2013.01); *E05D 11/06* (2013.01); *E05F 15/40* (2015.01); *E05F 15/41* (2015.01); *E05Y 2201/224* (2013.01); *E05Y 2201/654* (2013.01); *E05Y 2400/445* (2013.01); *E05Y 2900/544* (2013.01)

(58) Field of Classification Search
CPC ...... B60J 5/102; B62D 33/03; B62D 33/0273; E05Y 2900/544; E05Y 15/40; E05Y 2201/224; E05Y 2201/654; E05Y 2400/445; E05D 11/06; E05F 15/41
USPC ....................................... 296/57.1, 50; 49/26
See application file for complete search history.

(56) References Cited

U.S. PATENT DOCUMENTS 6,137,419 A * 10/2000 Lennox .................. B60Q 1/305
340/687
2007/0063535 A1 3/2007 Kargilis et al.
(Continued)

*Primary Examiner* — Amy R Weisberg
*Assistant Examiner* — Dana D Ivey
(74) *Attorney, Agent, or Firm* — Christopher G. Darrow; Darrow Mustafa PC

(57) ABSTRACT

A tailgate support cable assembly includes a cable and a retainer portion attached to an end of the cable. The retainer portion rotatably attaches the end of the cable assembly to a vehicle tailgate. The retainer portion includes a tailgate retention portion, an object contact portion extending from the tailgate retention portion, and a sensor engagement portion extending from the object contact portion. The retainer portion is structured to rotate with respect to the tailgate responsive to contact between the object contact portion and a foreign object positioned in a seam between the tailgate and another portion of the vehicle, during a closing movement of the tailgate. Rotation of the retainer portion brings the sensor engagement portion into contact with (and activates) a touch sensor mounted on the tailgate. Activation of the touch sensor causes a stoppage and/or reversal of tailgate movement, thereby preventing "pinching" of the foreign object.

5 Claims, 4 Drawing Sheets

(51) Int. Cl.
*B62D 33/03* (2006.01)
*E05D 11/06* (2006.01)
*E05F 15/40* (2015.01)
*E05F 15/41* (2015.01)

(56) References Cited

U.S. PATENT DOCUMENTS

2020/0141171 A1\* 5/2020 Ghannam ............... E05F 15/73
2021/0071464 A1   3/2021 Richards \* cited by examiner

TAILGATE SUPPORT CABLE ASSEMBLY WITH TOUCH SENSOR ACTIVATION FEATURE

TECHNICAL FIELD

The present invention relates to the operation of vehicle sensors and, more particularly, to a mechanism for operating a touch sensor mounted on a vehicle tailgate to prevent "pinching" of a foreign object located between the tailgate and another portion of the vehicle during closing of the tailgate.

BACKGROUND

A power tailgate (PTG) system may be installed in a pickup truck for purposes of automatically opening and closing a tailgate of the truck, using a switch inside the truck cab or a remote device, such as a key fob. In order to prevent injury to users when the tailgate opens and closes, touch sensors may be mounted along the side edges of the tailgate. When contacted by a user's hand, finger, or other foreign object positioned in a seam between the tailgate and a sidewall of the truck cargo bed, the touch sensor may activate, causing the closing motion of the tailgate to stop and/or reverse to prevent injury or damage to the foreign object.

One or more tailgate support cable assemblies may be used to help support the tailgate when the tailgate is in a fully-lowered position. Each cable assembly may have a first end attached to the tailgate and a second end attached to another portion of the truck (for example, a sidewall of the truck cargo bed). The cable assembly may fold as the tailgate closes. Under some conditions, during a closing movement of the tailgate, the foreign object may be positioned between the cargo bed sidewall and the folded cable assembly. In such cases, with the folded cable assembly interposed between the foreign object and the touch sensor, the foreign object may not be able to contact the touch sensor (or vice versa) to activate the touch sensor before the tailgate closes sufficiently to cause injury or damage (i.e., the foreign object is contacted by the folded cable assembly instead of by the touch sensor).

SUMMARY

In one aspect of the embodiments described herein, a retainer portion is structured to be attachable to a cable of a tailgate support cable assembly. The retainer portion includes a tailgate retention portion, an object contact portion extending from the tailgate retention portion and defining a reference plane, and a sensor engagement portion extending from the object contact portion and including a sensor contact portion extending in a direction away from the reference plane.

In another aspect of the embodiments described herein, a tailgate support cable assembly is provided. The tailgate support cable assembly includes a cable and a retainer portion attached to an end of the cable. The retainer portion includes a tailgate retention portion and an object contact portion extending from the tailgate retention portion and securing an end of the cable therein. The object contact portion defines an outer surface spaced outwardly apart from an outer surface of the end of the cable secured in the object contact portion. The retainer portion also includes a sensor engagement portion extending from the object contact portion and including a sensor contact portion spaced apart from the cable.

In yet another aspect of the embodiments described herein, a vehicle includes a cargo bed having a pair of opposed sidewalls, and a tailgate operably connected to the opposed sidewalls so as to be rotatable to extend between the sidewalls. A touch sensor is mounted on the tailgate and is configured to contact a foreign object positioned in a seam formed between the tailgate and a sidewall of the cargo bed during movement of the tailgate toward a fully-raised position. A tailgate support cable assembly extends between the tailgate and another portion of the vehicle for supporting the tailgate when the tailgate is in a fully-lowered position. The cable assembly includes a cable and a retainer portion attached to the cable. The retainer portion is operably connected to the tailgate so as rotate with respect to the tailgate responsive to direct physical contact with a foreign object inserted between the retainer portion and a sidewall of the cargo bed. The retainer portion includes a sensor contact portion structured to contact the touch sensor during rotation of the retainer portion.

DETAILED DESCRIPTION

Figure 1:
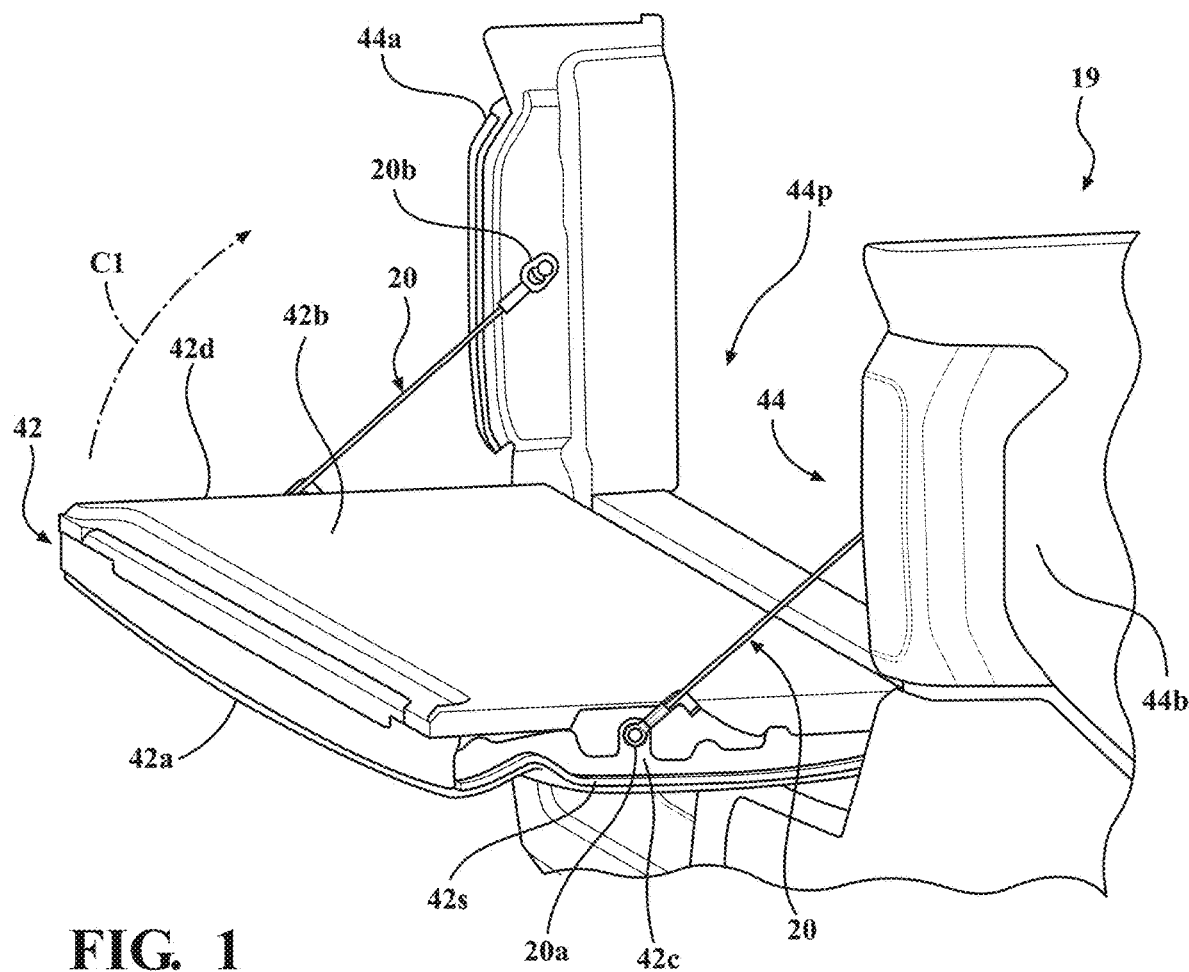
FIG. 1 is a partial rear perspective view of a portion of a pickup truck incorporating at least one tailgate support cable assembly in accordance with an embodiment described herein.

Embodiments described herein relate to a tailgate support cable assembly including a cable and a retainer portion attached to an end of the cable. The retainer portion includes a tailgate retention portion structured to attach and end of the cable assembly to a tailgate. The retainer portion also includes an object contact portion extending from the tailgate retention portion. The object contact portion may be structured to contact a foreign object residing in a seam between the tailgate and a sidewall of a truck cargo bed when the cable assembly is mounted on a truck so as to support the tailgate when the tailgate is in a fully-lowered position. The retainer portion also includes a sensor engagement portion extending from the object contact portion. The object contact portion and the sensor engagement portion are structured to be rotatable in unison responsive to contact of the object contact portion with a foreign object positioned in the seam during a closing or raising motion of the tailgate. Rotation of the sensor engagement portion brings it into contact with a touch sensor mounted on the tailgate. This activates the touch sensor, resulting in stoppage and/or reversal of the tailgate closing motion in order to help prevent injury or damage to the foreign object.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. Unless otherwise noted, similar reference characters are used to describe similar features on separate elements and/or embodiments.

FIG. 1 is a partial rear perspective view of a portion of a pickup truck 19 incorporating at least one tailgate support cable assembly 20 in accordance with an embodiment described herein. The pickup truck 19 may include a cargo bed 44 having opposed left and right sidewalls 44a and 44b, respectively, defining a rear opening 44p of the cargo bed 44. A tailgate 42 may be rotatably mounted to the pickup truck 19 for movement between a fully-open or lowered position (shown in FIG. 1) and a fully-raised or closed condition (not shown) in which the tailgate 42 extends between the sidewalls 44a, 44b and may be locked or latched to close the cargo bed opening 44p, as known in the pertinent art. The fully-raised position of the tailgate may be a position in which the tailgate resides in a vertical or near vertical orientation and in which the tailgate 42 may be latched or locked in a known manner. The tailgate 42 may have an outer wall 42a facing in a direction away from the cargo bed 44, an inner wall 42b positioned opposite the outer wall 42a and facing toward the cargo bed 44, and a pair of opposed connecting walls 42c, 42d extending between and joining the outer wall 42a and the inner wall 42b.

Although detailed aspects of the tailgate structure and the tailgate support cable assembly 20 will be described herein as applicable to one edge of the tailgate (i.e., a side edge of the tailgate 42 adjacent the right cargo bed sidewall 44b), it will be understood that the pertinent description applies also to the left side edge of the tailgate.

The tailgate 42 may be operably connected to an opening/closing mechanism (not shown) configured to open and close the tailgate 42 responsive to autonomously and/or manually-generated control commands. Operation of the opening/closing mechanism may be controlled by a suitably-configured electronic control unit (ECU) (not shown) of the pickup truck 19.

A touch sensor 42s may be mounted along each of connecting walls 42c, 42d. Each touch sensor 42s may be configured to contact a foreign object (for example, a finger or hand of a human user) positioned in a seam 43s (FIGS. 4A-4D) formed between the tailgate 42 and one of sidewalls 44a, 44b during a closing or raising motion of the tailgate 42.

Referring to the right side edge of the tailgate 42 (including connecting wall 42c) shown in FIGS. 4A-4D, touch sensor 42s may be communicatively coupled to the ECU. The ECU may be configured to, responsive to contact between the foreign object F1 and the touch sensor 42s, control operation of the tailgate opening/closing mechanism so as to stop further motion of the tailgate 42 in the tailgate closing direction Cl. This may help prevent damage to the foreign object and/or the tailgate 42. In particular arrangements, the ECU may be configured to, responsive to contact between the foreign object and the touch sensor 42s, control operation of the tailgate opening/closing mechanism so as to reverse the motion of the tailgate 42 after stopping the tailgate, so that the tailgate travels in an opening or lowering direction OP1 (FIG. 4D) until the tailgate 42 is in the fully-open position shown in FIG. 1.

Referring to FIGS. 1 and 2A-2C, a tailgate support cable assembly 20 may be attached to the pickup truck 19 to help support the tailgate 42 when the tailgate is in the fully-open or lowered position. A first end 20a of a tailgate support cable assembly 20 may be attached to the tailgate 42 and a second, opposite end 20b of the cable assembly 20 may be attached to an associated cargo bed sidewall (in this case, right sidewall 44b) or to another portion of the pickup truck 19.

Figure 2A:
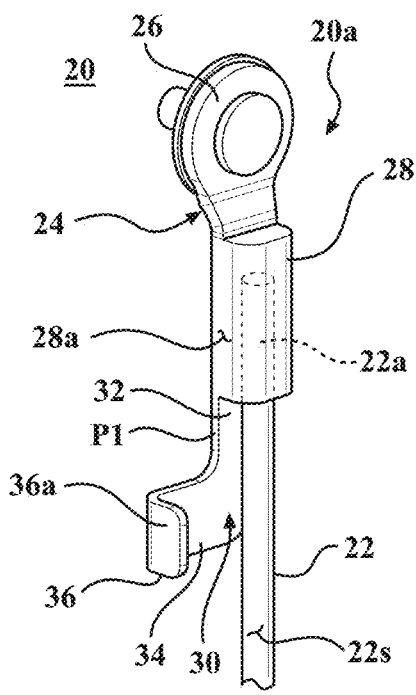
FIG. 2A is a partial perspective view of an end of a tailgate support cable assembly including a retainer portion in accordance with an embodiment described herein.
Figure 2B:
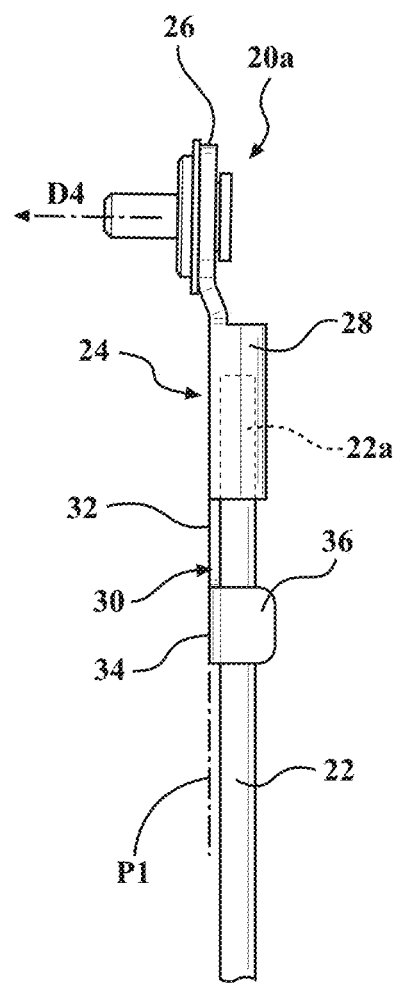
FIG. 2B is a rear view of the portion of the cable assembly shown in FIG. 2A.
Figure 2C:
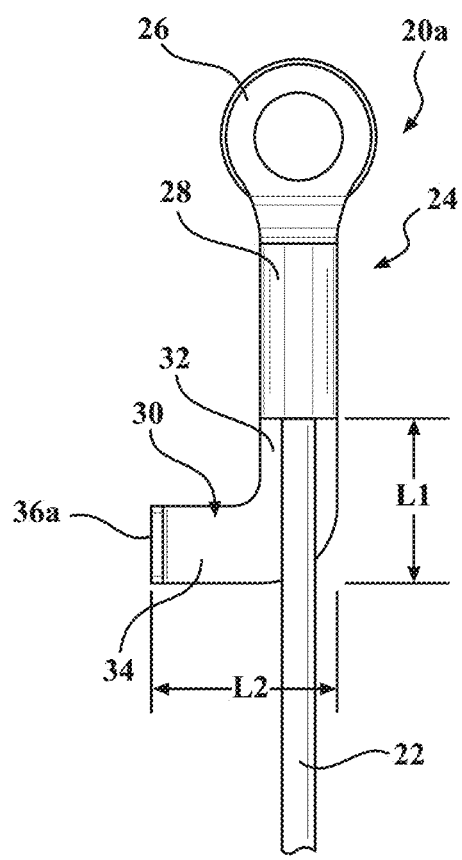
FIG. 2C is a side view of the portion of the cable assembly shown in FIG. 2A.

FIG. 2A is a partial perspective view of an end of a tailgate support cable assembly 20 including a retainer portion 24 in accordance with an embodiment described herein. FIG. 2B is a rear view of the portion of the cable assembly shown in FIG. 2A. FIG. 2C is a side view of the portion of the cable assembly shown in FIG. 2A. Referring to FIGS. 2A-2C, in one or more arrangements, the cable assembly 20 may include a retainer portion 24 structured to be attachable to a tailgate support cable (such as cable 22). The retainer portion 24 may be attached to the cable first end 22a.

The retainer portion 24 may include a tailgate retention portion 26 structured to enable attachment of the retainer portion 24 to the tailgate 42 so that the retainer portion 24 is rotatable with respect to the tailgate 42. In one or more arrangements, the tailgate retention portion 26 may be structured for rotatable attachment to tailgate connecting wall 42c as described herein. Also, as described herein, the tailgate retainer portion 24 may be connected to the tailgate 42 so as to be rotatable with respect to the tailgate 42 responsive to contact with a foreign object inserted between an object contact portion 28 (described below) of the retainer portion 24 and cargo bed sidewall 44b. The retainer portion 24 may be fabricated as a rigid structure (from a metallic material, for example) so that the entire retainer portion 24 may rotate in unison with respect to the tailgate 42 responsive to a force exerted on the retainer portion 24. In one or more arrangements, the tailgate retention portion 26 may be in the form of an eyelet through which a bolt may be inserted for mating with a threaded hole or a suitable grommet mounted in the tailgate 42.

Referring to FIGS. 2A-2C, an object contact portion 28 may extend from the tailgate retention portion 26. The object contact portion 28 may be structured for securing the first end 22a of the cable therein. In one or more arrangements, the object contact portion 28 may be formed as a crimping structure which may be crimped over a cable end 22a positioned in the undeformed crimping structure prior to crimping, thereby securing the cable end 22a therein.

The object contact portion 28 may extend from the tailgate retention portion 26 and may be structured so as to occupy a volume of space adjacent the tailgate retention portion 26. The object contact portion 28 may be structured and positioned such that, after the first end 22a of the cable 22 has been secured in the object contact portion 28, the object contact portion 28 may directly physically contact a foreign object (such as a hand or finger) inserted into a seam 43s between the tailgate 42 and the cargo bed sidewall 44b adjacent the object contact portion 28, during raising of the tailgate 42.

To facilitate contact with the foreign object, an outer surface 28a of the object contact portion 28 may be spaced outwardly apart or away from an outer surface 22s of the end 22a of the cable 22 secured in the object contact portion 18. This extension of the object contact portion 28 outwardly from the cable outer surface 22s may help ensure that the object contact portion 28 contacts the foreign object prior to another portion of the cable assembly (for example, a body of the cable 22 itself) contacting the foreign object. This, in turn, helps ensure prompt rotation of the retainer portion 24 so that the sensor contact portion 36 (described below) contacts the touch sensor 42s and activates the touch sensor before injury to the fingers/hand of a user positioned in the seam 43a.

Referring again to FIGS. 2A-2C, the object contact portion 28 may define a reference plane P1 along a side of the object contact portion 28 facing in a direction of attachment D4 of the tailgate retention portion 26 to the tailgate 42. As seen in FIGS. 2A-2C, in one or more arrangements, the object contact portion 28 may be structured to extend in a direction away from the reference plane P1 and in a direction away from the tailgate 42 when the tailgate retention portion 26 is attached to the tailgate 42.

A sensor engagement portion 30 may extend from the object contact portion 28. The sensor engagement portion 30 may extend along the reference plane P1 and may be structured to directly physically contact a tailgate touch sensor 42s responsive to rotation of the retainer portion 24, as described herein. The sensor engagement portion 30 may include a base portion 32 extending from the object contact portion 28 a predetermined length L1 in a direction way from the object contact portion 28. A sensor contact support 34 may extend from the base portion 32. The sensor contact support 34 may be structured to extend from the base portion 32 in a direction away from a cable 22 secured in the object contact portion 28. The sensor contact support 34 may be structured so as to extend from the base portion 32 in a direction toward an associated tailgate touch sensor 42s when the tailgate retention portion 26 is rotatably secured to an associated tailgate connecting wall. An overall length of the sensor contact support 34 is indicated by the dimension L2 shown in FIG. 2C.

A sensor contact portion 36 may extend generally orthogonally from the sensor contact support 34. The sensor contact portion 36 may include a contact face 36a structured to directly physically contact the tailgate touch sensor 42s responsive to rotation of the retainer portion 24. The sensor contact portion 36 may be structured to be in alignment with the associated touch sensor 42s when the tailgate retention portion 26 is secured to an associated tailgate connecting wall 42c, so that rotation of the retainer portion 24 about the tailgate retention portion 26 causes the sensor contact portion 36 to directly physically contact the touch sensor 42s.

Figure 3:
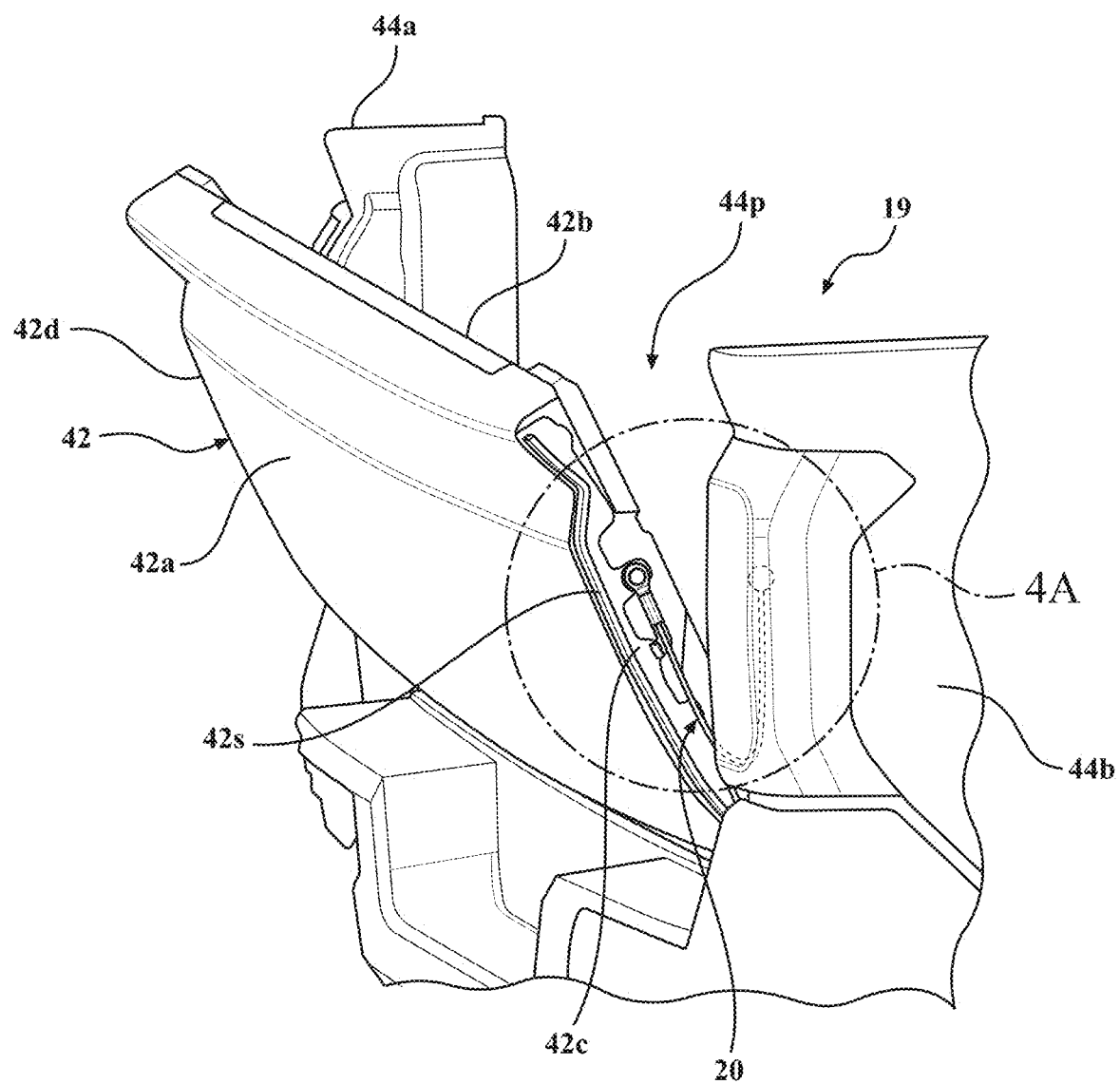
FIG. 3 is the partial rear perspective view of claim 1 showing the tailgate in a partially closed or raised position.

FIG. 3 is the partial rear perspective view of claim 1 showing the tailgate in a partially closed or raised position. FIGS. 4A-4D are schematic side views of a portion of the tailgate 42 showing operation of the retainer portion 24 during an autonomous closing operation of the tailgate 42.

Figure 4A:
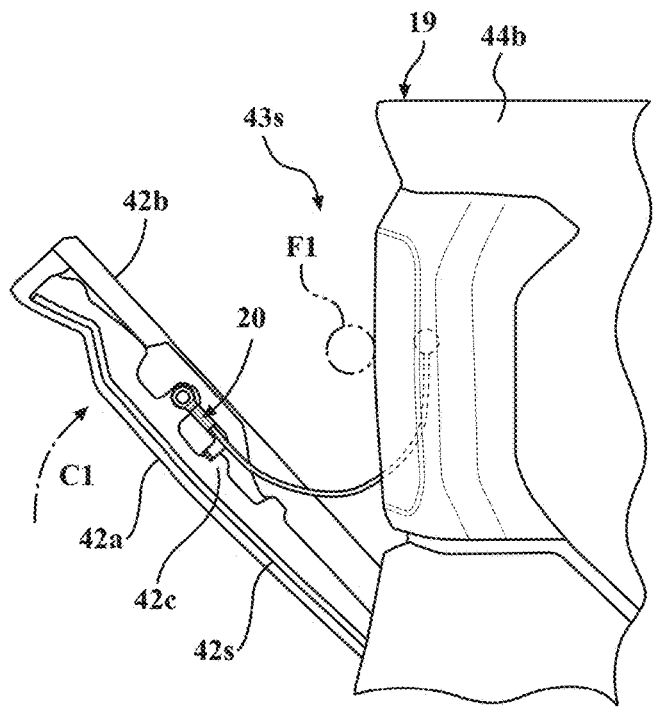
FIG. 4A is a side view of the tailgate shown in FIG. 3 and showing a foreign object F1 positioned in a seam between the tailgate and a sidewall of the pickup truck cargo bed prior to contact of the cable assembly with the foreign object.
Figure 4B:
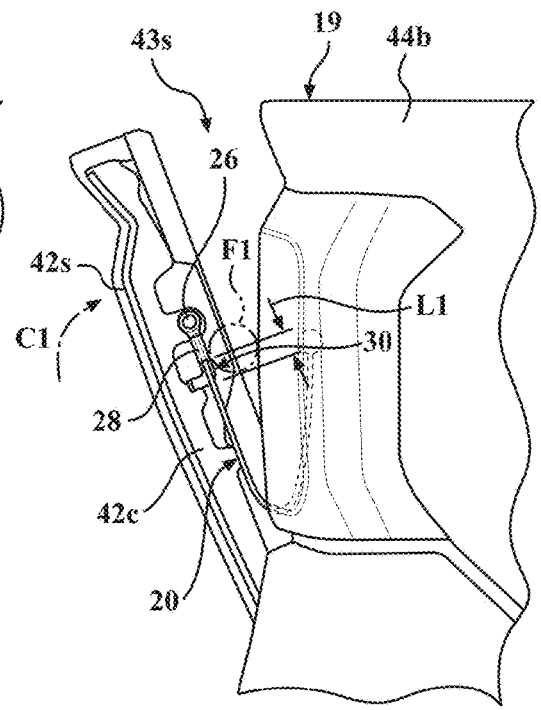
FIG. 4B is the side view of the tailgate shown in FIG. 4A, showing the tailgate in a further raised position producing initial contact between the foreign object F1 and a retainer portion of the cable assembly.
Figure 4C:
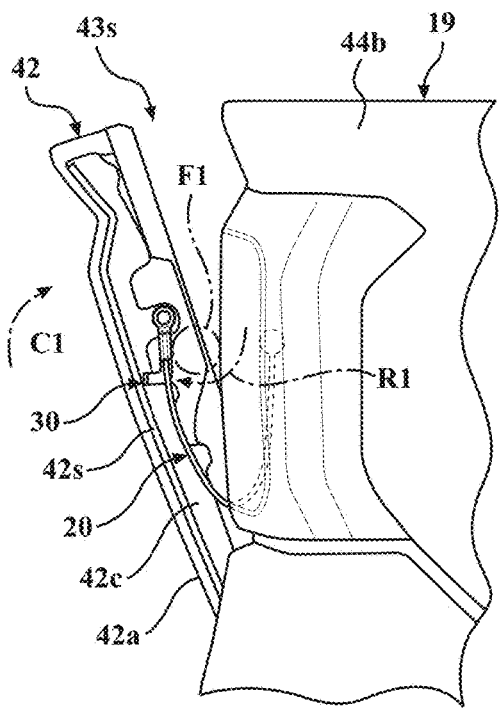
FIG. 4C is the side view of the tailgate shown in FIG. 4A, showing rotation of the cable assembly retainer portion and contact of a sensor contact portion of the retainer portion with a touch sensor of the tailgate, responsive to contact of the retainer portion with the foreign object.
Figure 4D:
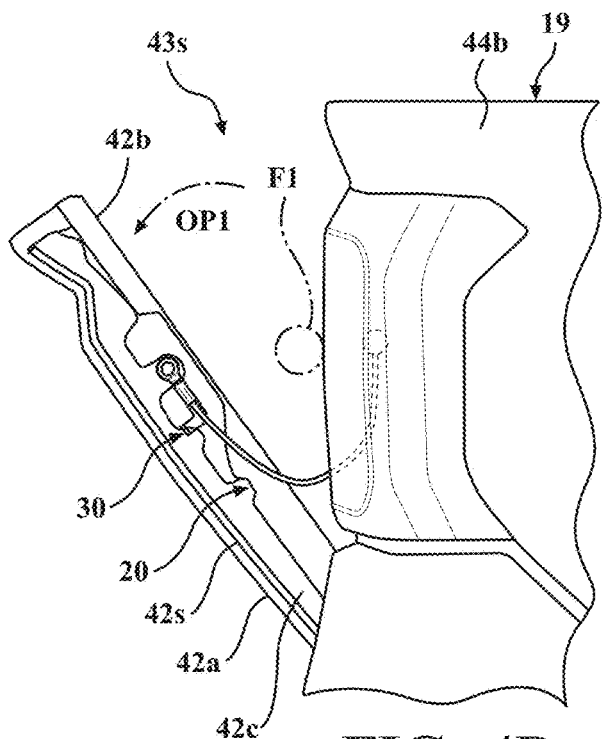
FIG. 4D is the side view of the tailgate shown in FIG. 4C, showing reversal of the tailgate rotation direction to a tailgate opening direction responsive to contact of the retainer portion with the touch sensor as shown in FIG. 4C.

In FIG. 4A, the tailgate 42 is shown moving in a closing direction C1 of the tailgate. FIG. 4A also shows a foreign object F1 (such as a finger or hand of a user) in a position between the tailgate 42 and a cargo bed sidewall 44b. In FIG. 4B, the tailgate 42 has risen to a point where the object contact portion 28 of the retainer portion 24 contacts the foreign object F1. In FIG. 4C, responsive to further motion of the tailgate 42 in direction C1 after the object contact portion 28 has contacted the foreign object F1, the entire retainer portion 24 may rotate about the connection provided by tailgate retention portion 26, instead of "pinching" the foreign object F1. Rotation of the retainer portion 24 continues until the contact face 36a of the sensor contact portion 36 directly physically contacts the touch sensor 42s. Contact of the sensor contact portion 36 with the touch sensor 42s activates the touch sensor, causing the tailgate motion to stop. In one or more arrangements, the tailgate motion may then reverse to an opening direction OP1 of the tailgate 42 to facilitate removal of the foreign object F1 from between the tailgate 42 and the sidewall 44b.

In the above detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A retainer portion structured to be attachable to a cable of a tailgate support cable assembly, the retainer portion comprising:
    a tailgate retention portion;
    an object contact portion extending from the tailgate retention portion and defining a reference plane; and
    a sensor engagement portion extending from the object contact portion and including a sensor contact portion extending in a direction away from the reference plane.

2. The retainer portion of claim 1, wherein the object contact portion is structured to extend in the direction away from the reference plane and in a direction away from a tailgate when the tailgate retention portion is attached to the tailgate.

3. The retainer portion of claim 1, wherein the sensor engagement portion includes:
    a base portion extending from the object contact portion in a direction away from the tailgate retention portion; and a sensor contact support structured to extend from the base portion in a direction away from a cable secured in the object contact portion, wherein the sensor contact portion extends from the sensor contact support.

4. A tailgate support cable assembly comprising:

a cable; and a retainer portion attached to an end of the cable, the retainer portion including:

a tailgate retention portion;

an object contact portion extending from the tailgate retention portion and securing an end of the cable therein, the object contact portion defining an outer surface spaced outwardly apart from an outer surface of the end of the cable secured in the object contact portion; and a sensor engagement portion extending from the object contact portion and including a sensor contact portion spaced apart from the cable.

5. A vehicle comprising:

a cargo bed including a pair of opposed sidewalls;

a tailgate operably connected to the opposed sidewalls so as to be rotatable to extend between the sidewalls;

a touch sensor mounted on the tailgate and configured to contact a foreign object positioned in a seam formed between the tailgate and a sidewall of the cargo bed during movement of the tailgate toward a fully-raised position; and a tailgate support cable assembly extending between the tailgate and another portion of the vehicle for supporting the tailgate when the tailgate is in a fully-lowered position, the cable assembly including a cable and a retainer portion attached to the cable, the retainer portion being operably connected to the tailgate so as rotate with respect to the tailgate responsive to direct physical contact with a foreign object inserted between the retainer portion and another portion of the vehicle, the retainer portion including a sensor contact portion structured to contact the touch sensor during rotation of the retainer portion.

\* \* \* \* \*